US006070793A

United States Patent [19]

Reichl et al.

[11] Patent Number: 6,070,793

[45] Date of Patent: Jun. 6, 2000

[54] METHOD AND ARRANGEMENT FOR TRACKING AND CONTROLLING THE DELIVERY AND/OR PICKUP OF GOODS/CONTAINERS FOR GOODS

[75] Inventors: Horst Reichl, Gerlingen; Peter Schirmbeck, Gross -Gerau; Hergen M. Tantzen, Verbert, all of Germany

[73] Assignee: Eastman Kodak Company, Rochester, N.Y.

[21] Appl. No.: 09/010,707

[22] Filed: Jan. 22, 1998

[30] Foreign Application Priority Data

Jan. 22, 1997 [DE] Germany ........................... 197 02 077

[51] Int. Cl.[7] ............................ G06F 17/00; G06F 17/60; G07B 15/02; G06K 7/10

[52] U.S. Cl. .......................... 235/375; 235/384; 235/385; 235/472.01

[58] Field of Search ..................................... 235/384, 385, 235/375, 472.01; 364/478.01, 478.13, 478.1, 468.22

[56] References Cited

U.S. PATENT DOCUMENTS

| | | | |
|---|---|---|---|
| 4,628,193 | 12/1986 | Blum . | |
| 4,832,204 | 5/1989 | Handy et al. | 209/3.3 |
| 5,621,647 | 4/1997 | Kraemer et al. | 364/468.22 |
| 5,804,802 | 9/1998 | Card et al. | 235/375 |
| 5,914,481 | 6/1999 | Danielson et al. | 235/472 |

FOREIGN PATENT DOCUMENTS

| | | |
|---|---|---|
| 0 645 728 | 3/1995 | European Pat. Off. . |
| 94/22580 | 10/1994 | WIPO . |
| 96/13015 | 5/1996 | WIPO . |

*Primary Examiner*—Thien M. Le
*Assistant Examiner*—Daniel H. Sherr
*Attorney, Agent, or Firm*—Frank Pincelli

[57] ABSTRACT

A method for tracking and controlling the delivery and/or pickup of goods/containers for goods comprises the steps of a) taking a mobile data terminal in a service center, the mobile data terminal having an integrated barcode scanner for reading the data required for performing tracking and control; b) reading the data which identify a driver performing the pickup or delivery, his route and transportation vehicle used for this purpose; c) storing of the data read in step b) in a storage of the mobile data terminal and displaying of the data read in step b) in a readable form; d) arriving at all customers on the round and reading of each customer's barcoded data and of the data of the goods/containers for goods to be picked-up or delivered at the customer together with the simultaneous storage of date and the time; e) storing the data (including the date and the time) read in step d) in the storage of the mobile data terminal and displaying the data read in step d) in readable form in the display of the mobile data terminal; and f) after completion of the round, transferring of the data from the storage of the mobile data terminal to the computer system in the service center. The arrangement for the above-mentioned method comprises a mobile data terminal with a display and keys for data input and for calling up certain functions stored in the mobile data terminal respectively. A barcode scanner is integrated into the mobile data terminal. All data to be collected are available in the form of a barcode: one barcode is allocated to a driver, one to a transportation vehicle, one to each customer on a round and one to each of the containers for goods which are to be delivered to customers and/or to be picked up from customers.

9 Claims, 7 Drawing Sheets

METHOD AND ARRANGEMENT FOR TRACKING AND CONTROLLING THE DELIVERY AND/OR PICKUP OF GOODS/ CONTAINERS FOR GOODS

FIELD OF THE INVENTION

The invention relates to a method for tracking and controlling the delivery and/or pickup of goods/containers for goods. In addition, the invention relates to an arrangement for tracking and controlling the delivery and/or pickup of goods/containers for goods, said arrangement comprising a mobile data terminal with a display and a keyboard for the input of data and the activation of certain functions stored in the mobile data terminal respectively, said arrangement also being provided with a control center having a computer system to which the data stored in the mobile data terminal can be transmitted or through which the functions stored in the data terminal can be updated.

BACKGROUND OF THE INVENTION

WO-96/13015 discloses a system for tracking the delivery of parcels. The system comprises a portable data terminal with a keyboard and a device for reading the barcode. The portable data terminal is so designed that it can accept and store the data of a certain parcel (barcode), the signature information and the information provided via the keyboard. The data stored in the data terminal are sent via a modem to a central computer.

WO-94/22580 describes a device for producing labels for the identification and for the tracking of samples to be tested in a laboratory. Parts of the barcodes on the samples can also be used for the delivery/pickup at another laboratory. The publication does not disclose the use of the barcoded data for tracking delivery and/or pickup.

In EP-A-0 645 728 an optical scanner is described which is integrated into a communication unit (telephone, mobile phone etc.). Among other things, the scanner can be used for the tracking of stock and sales. The scanned data are immediately transferred to the computer unit. In this instance, storage of the scanned data in the portable unit is not possible.

SUMMARY OF THE INVENTION

An object of the present invention is to provide a reliable method and an arrangement which can be used to track the delivery to and pickup from a customer of goods/containers for goods, respectively. In addition, this arrangement and method is intended to provide a fast and reliable information system with which customer inquiries can be answered in detail.

In accordance with the present invention, this method is achieved by means of the following steps:

a.) taking a mobile data terminal in a service center, said mobile data terminal having an integrated barcode scanner which can read the data necessary for performing tracking and control;

b.) reading the barcoded data which serve to identify the driver performing the delivery or pickup , his route and the vehicle used for transportation of the goods;

c.) storing of the data read in step b) in a storage of the mobile data terminal and displaying the data read in step b) in readable form;

d.) arriving at all customers on the delivery or pickup round and reading of each customer's barcoded data and the data of the goods/containers for goods to be picked up or delivered to said customer with simultaneous storage of date and time;

e.) storing the data (including the date and the time) read in step d) in the storage of the mobile data terminal and displaying the data read in step d) in readable form in the display of the mobile data terminal, and f.) after completion of the delivery and/or pickup round, transferring the data from the storage of the mobile data terminal to the computer system of the service center.

In accordance with the present invention, this object is further achieved in that the arrangement has a barcode scanner integrated in the mobile data terminal, and in that all data to be read by the mobile data terminal are available in the form of a barcode, and in that one barcode is allocated to each driver, one to each transport vehicle, one to each customer of a particular round and one to each container which is to be delivered to and picked up from a customer, respectively.

The advantage of the method and the arrangement in accordance with the present invention is that by using a barcode scanner which is integrated in the mobile data terminal, all data necessary for tracking the delivery and pickup, respectively, can be read and stored in said mobile data terminal. The data stored in the mobile data terminal are read in a control center thereby permitting the completed delivery or pickup to be protocolled. The protocol can contain the day, the time, the number of goods/containers for goods, the identification number of the goods/containers for goods, the name of the customer, the customers's identification number and the driver's personal number. The transfer of the data collected by the mobile data terminal to a computer system in a service center provides an instrument able to work quickly and reliably when a response is needed to a customer inquiry. All data are stored in a databank and can be used by applying conventional retrieval techniques.

In addition, the program implemented in the mobile data terminal is so designed that during the process of delivering goods or loading the transport vehicle, it is possible to check whether the right goods/containers for goods have been loaded for a particular round.

The subject matter of the invention will now be described with reference to an embodiment shown in the drawings.

DETAILED DESCRIPTION OF THE INVENTION

A mobile data terminal 1 is used to perform the acquisition of data. A possible embodiment is shown in FIGS. 1*a* to 1*d*. It is obvious that the number of keys 2 for the manual input are tailored to meet the needs of the application for which data terminal 1 is used. Modification of keys 2 to suit particular requirements is useful in order to minimize wrong inputs or manipulations by the person operating the terminal. Mobile data terminal 1 has a display 4 showing the different steps of the method and the tasks to be performed by the operator, respectively. Keys 2 are connected to display 4 and are used for making selections and for entering data. An upper left key 2*a* can be used to switch on mobile data terminal 1 and an upper right key 2*b* can be used to switch off mobile data terminal 1. The upper left key 2*a* bears the label "SELECTION" and is used in the program in the mobile data terminal to activate keys with two different functions. A "DATA ACQUISITION" key 2*c* is provided next to upper right key 2*a* which, when pressed, produces an empty display 4 thereby allowing the acceptance of new sets of data. Next to "DATA ACQUSITION" key 2*c* is "END" key 2*d* which terminates a certain action and makes a return to the next highest program level possible. The upper right key 2*b* is labeled "NO" and serves to negate the messages shown in display 4. In addition, as already mentioned, simultaneous pressing of keys 2*a* and 2*b* serves to activate or switch off the mobile data terminal. A first and a second arrow key 2*e* and 2*f* are provided directly below upper right key 2*b*. By pressing the first and the second arrow key 2*e* and 2*f* it is posible to scroll line by line over the menu points and over the acquisition data in the upward or downward direction. When the upper left key 2*a* is pressed either the first or last data set or menu point is displayed. "RUBOUT" key 2*g* is provided below the second arrow key. Using said key 2*g* the cursor can be moved in an input field to the left. "INPUT" key 2*h* is located below "RUBOUT" key 2*g*. By pressing said key 2*h*, data can be entered via keys 2 and the numerical keys respectively. A"JUMP" key 2*k* which is positioned below the upper left key 2*a* can be used to move the cursor during the processing of a task. A "SCAN" key 2*i* which is set next to "JUMP" key 2*k* can be pressed to activate a built-in barcode scanner 10.

Figure 1A:
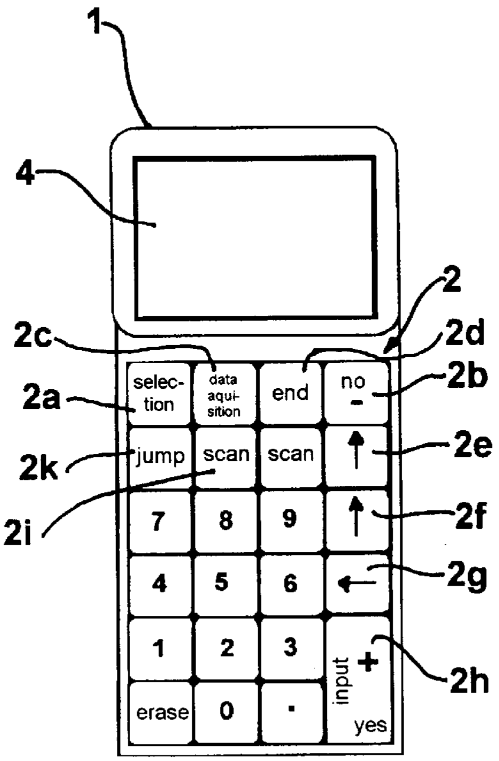
FIGS. 1*a*–1*d* show a topview, a rear view, a front view and a side view of an embodiment of a mobile data terminal used.
Figure 1B:
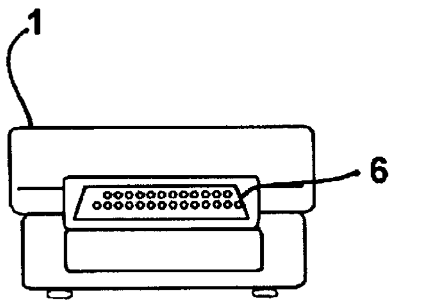
Figure 1C:
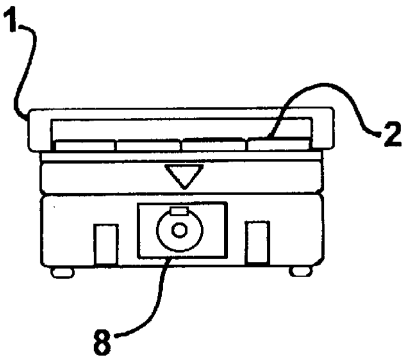
Figure 1D:
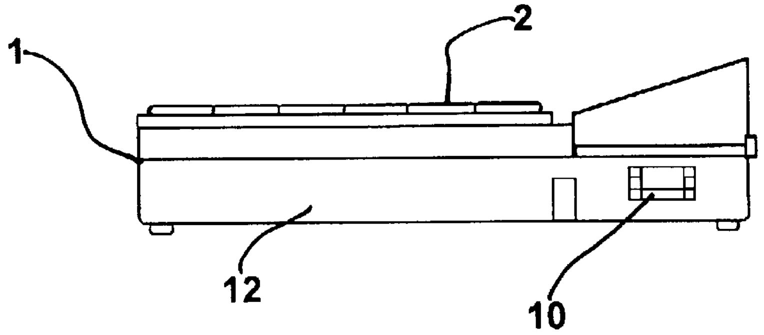

FIG. 1*b* shows a rear view of mobile data terminal 1 wherein an interface 6 for the transfer of data is integrated. In addition, a connection 8 for a battery charger is integrated into mobile data terminal 1 (see FIG. 1*c* ) thereby allowing recharging of the batteries (not shown) in mobile data terminal 1. In the embodiment shown in FIG. 1*d*, barcode scanner 10 is integrated in side wall 12 of mobile data terminal 1. It is obvious, however, that barcode scanner 10 can be integrated anywhere in mobile data terminal 1.

Figure 2:
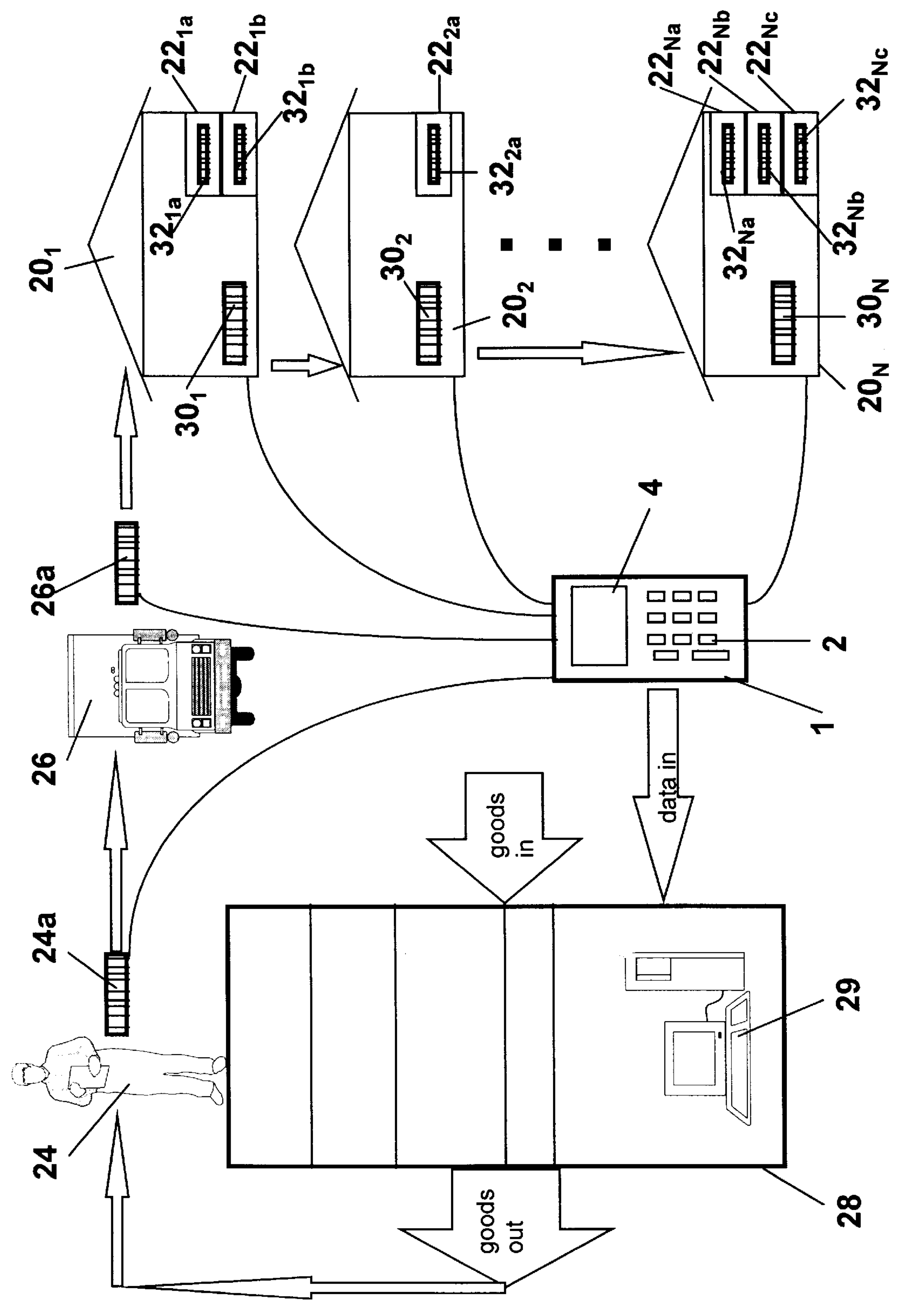
FIG. 2 represents a schematic drawing of the method for picking up and delivering goods/containers for goods to customers, respectively.

The use of mobile data terminal 1 for the pickup of goods and/or containers for goods $\mathbf{22}_{1a}$, $\mathbf{22}_{1b}$, $\mathbf{22}_{2a}$, . . . $\mathbf{22}_{Na}$, $\mathbf{22}_{Nb}$, $\mathbf{22}_{Nc}$ from different customers $\mathbf{20}_1$, $\mathbf{20}_2$ to $\mathbf{20}_N$ is illustrated in the method as graphically shown in FIG. 2. A service center 28 provides a driver 24 of a transportation vehicle 26 with the mobile data terminal 1. Driver 24 is given a barcode 24*a* which contains the driver's personal identification number. This barcode 24*a* is read into mobile data terminal 1 by barcode scanner 10. In the same way, transportation vehicle 26 can be given a barcode 26*a* which is likewise recorded by barcode scanner 10. On his route the driver has to visit several customers $\mathbf{20}_1$, $\mathbf{20}_2$ to $\mathbf{20}_N$ and has to pick up goods/containers for goods $\mathbf{22}_{1a}$, $\mathbf{22}_{1b}$, $\mathbf{22}_{2a}$, . . . $\mathbf{22}_{Na}$, $\mathbf{22}_{Nb}$, $\mathbf{22}_{Nc}$ from the customers $\mathbf{20}_1$, $\mathbf{20}_2$ to $\mathbf{20}_N$. Each customer $\mathbf{20}_1$, $\mathbf{20}_2$ to $\mathbf{20}_N$ on the driver's route likewise has a barcode $\mathbf{30}_1$, $\mathbf{30}_2$ to $\mathbf{30}_N$. This barcode $\mathbf{30}_1$, $\mathbf{30}_2$ to $\mathbf{30}_N$ can be posted in a pickup room (not shown) or on a door which is opened with a suitable key by driver 24. Barcode $\mathbf{30}_1$, $\mathbf{30}_2$ to $\mathbf{30}_N$ assigned to customer $\mathbf{20}_1$, $\mathbf{20}_2$ to $\mathbf{20}_N$ is likewise read by scanner 10 integrated in mobile data terminal 1. The number of the customer is displayed on display 4 and stored in the storage of mobile data terminal 1. For example, driver 24 arrives at first customer $\mathbf{20}_1$ on his route and uses mobile data terminal 4 to read barcodes $\mathbf{32}_{1a}$ and $\mathbf{32}_{1b}$ attached to goods/containers for goods $\mathbf{22}_{1a}$ and $\mathbf{22}_{1b}$ to be picked up; thereafter, the goods/containers for goods $\mathbf{22}_{1a}$ and $\mathbf{22}_{1b}$ are loaded onto transportation vehicle 26. The same procedure is performed at following customers $\mathbf{20}_2$ to $\mathbf{20}_N$ on said driver's route. After finishing his round, driver 24 returns with transportation vehicle 26 to the service center, where picked-up goods/containers for goods $\mathbf{22}_{1a}$, $\mathbf{22}_{1b}$, $\mathbf{22}_{2a}$, . . . $\mathbf{22}_{Na}$, $\mathbf{22}_{Nb}$, $\mathbf{22}_{Nc}$ are handed over for further processing and the data are read from the storage of mobile data terminal 1. The data can be stored, for instance, in a computer system 29 of a conventional data bank and are hence available for all kinds of search and documentation processes. The data in the storage of mobile data terminal 1 are erased after their transfer from mobile data terminal 1 to computer system 29. In addition, the batteries of mobile data terminal 1 are exchanged or recharged in service center 28.

When delivering goods/containers for goods $\mathbf{22}_{1a}$, $\mathbf{22}_{1b}$, $\mathbf{22}_{2a}$, . . . $\mathbf{22}_{Na}$, $\mathbf{22}_{Nb}$, $\mathbf{22}_{Nc}$, driver 24 is given mobile data terminal 4 by service center 28. He then uses barcode scanner 10 of mobile data terminal 1 to read his barcode 24*a* and barcode 26*a* of transport vehicle 26. Transportation vehicle 26 is loaded with goods/containers for goods $\mathbf{22}_{1a}$, $\mathbf{22}_{1b}$, $\mathbf{22}_{2a}$, . . . $\mathbf{22}_{Na}$, $\mathbf{22}_{Nb}$, $\mathbf{22}_{Nc}$. In the course of his round, the driver goes to different customers $\mathbf{20}_1$, $\mathbf{20}_2$ to $\mathbf{20}_N$. Upon arrival at his first customer $\mathbf{20}_1$, for example, the driver opens the door to a pickup or delivery room and scans barcode $\mathbf{30}_1$ put at his disposal there by first customer $\mathbf{20}_1$. During this step mobile data terminal 1 registers both date and time. In the next step, barcode scanner 10 of mobile data terminal 1 is used to read barcodes $\mathbf{32}_{1a}$ and $\mathbf{32}_{1b}$ of goods/containers for goods $\mathbf{22}_{1a}$ and $\mathbf{22}_{1b}$ which have been delivered to first customer $\mathbf{20}_1$. In this way, the data acquisition at first customer $\mathbf{20}_1$ is completed and the same method is used at all subsequent customers $\mathbf{20}_2$ to $\mathbf{20}_N$ on the driver's tour.

In another embodiment of the method, driver 24 reads all barcodes attached to goods/containers for goods $\mathbf{22}_{1a}$, $\mathbf{22}_{1b}$, $\mathbf{22}_{2a}$, . . . $\mathbf{22}_{Na}$, $\mathbf{22}_{Nb}$, $\mathbf{22}_{Nc}$ with barcode scanner 10 of mobile data terminal 1 in service center 28; this operation is performed, for example, when loading transportation vehicle 24. When said driver makes his first delivery stop at first customer $\mathbf{20}_1$, barcodes $\mathbf{32}_{1a}$ and $\mathbf{32}_{1b}$ of goods/containers for goods $\mathbf{22}_{1a}$ and $\mathbf{22}_{1b}$ are scanned. Mobile data terminal 1 then checks to ensure that the delivery at first customer $\mathbf{20}_1$ is correct, and if necessary, will notify the driver should a container be delivered which does not belong to first customer $\mathbf{20}_1$.

Once driver 24 has been to all customers $\mathbf{20}_1$, $\mathbf{20}_2$ to $\mathbf{20}_N$ on his route, he then returns mobile data terminal 1 to service center 28. In addition, the data can be transferred via an acoustic coupler or mobile telephone to computer system 29 in service center 28.

In another embodiment of the method according to the present invention, there is no strict separation of delivery and pickup rounds. In this case, driver 24 can use a selection menu in display 4 of mobile data terminal 1. Driver 24 decides between a pickup or a delivery to a customer, or a change of driver. Delivery and pickup can be performed at the same time.

Via display 4 of mobile data terminal 1, driver 24 can control the collected data, or he can use the different functions offered in display 4 to change from one level of the program to the next. All data collected from the various types of barcodes by means of barcode scanner 10 are stored in the different data sets in the order in which they were acquired. As a consequence, while still processing a customer order, it is possible to scroll over all already available data sets; this is done using first arrow key 2*e* or second arrow key 2*f*. If the beginning or the end of a data set is reached during scrolling, then an acoustical signal will be heard. With "DATA ACQUISITION" key 2*c*, the data input mask is shown empty and a new data set can be read by barcode scanner 10 and stored in mobile data terminal 1. With "END" key 2*d*, the current operation is terminated and the next highest program level appears in display 4 of mobile data terminal 1.

It should be remarked at this point that the numbers of customers $\mathbf{20}_1$, $\mathbf{20}_2$ to $\mathbf{20}_N$ or the numbers of goods/containers for goods $\mathbf{22}_{1a}$, $\mathbf{22}_{1b}$, $\mathbf{22}_{2a}$, . . . $\mathbf{22}_{Na}$, $\mathbf{22}_{Nb}$, $\mathbf{22}_{Nc}$ can also be read into mobile data terminal 1 via the numerical keys of said terminal.

Figure 3:
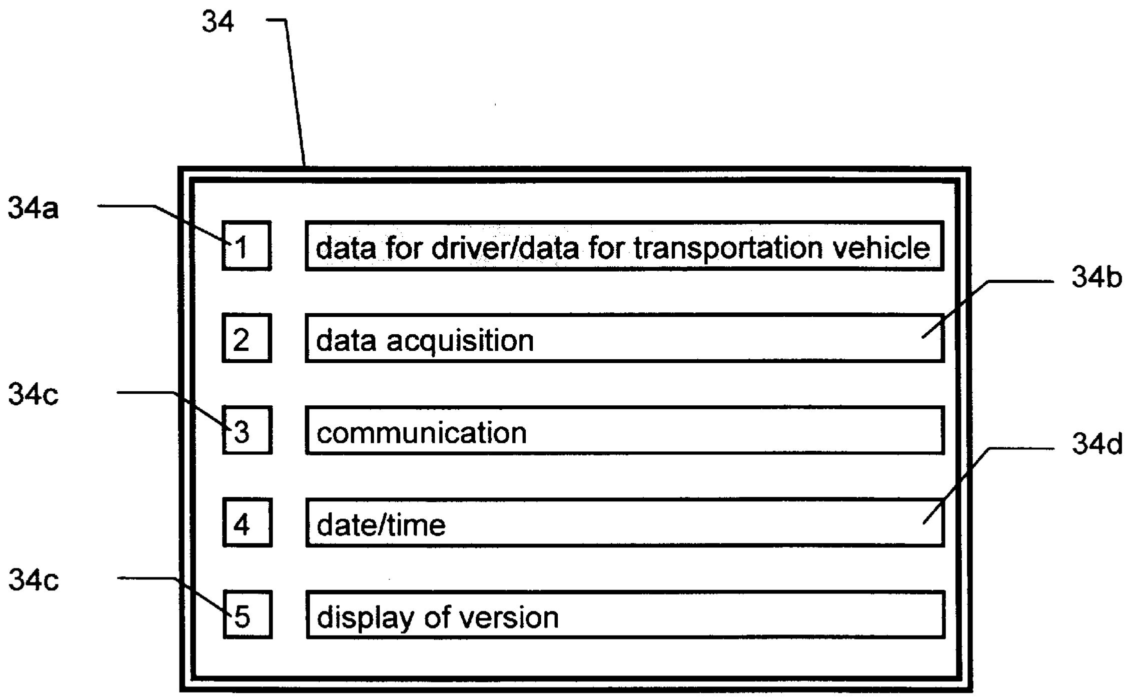
FIG. 3 depicts the main menu on the display of the mobile data terminal.

When mobile data terminal 1 is switched on, the program implemented in mobile data terminal 1 is displayed. In particular, the version of the program just used and the current day's date is displayed. By pressing "INPUT" key 2*h*, driver 24 gets to display 34 as shown in FIG. 3. Display 34 represents the main menu of the implemented program. In the embodiment shown here, the display shows five lines 34*a*, 34*b*, 34*c*, 34*d* and 34*e*. Selection of the first line 34*a* allows data concerning driver 24 and/or transportation vehicle 26 to be read into mobile data terminal 1. Second line 34*b* makes it possible to start the part of the program for the acquisition of data contained in barcodes of customers $\mathbf{20}_1$, $\mathbf{20}_2$ to $\mathbf{20}_N$ and of the data in the barcodes of goods/containers for goods $\mathbf{22}_{1a}$, $\mathbf{22}_{1b}$, $\mathbf{22}_{2a}$, . . . $\mathbf{22}_{Na}$, $\mathbf{22}_{Nb}$, $\mathbf{22}_{Nc}$. The third menu point in third line 34*c* calls up the part of the program which deals with communication. Here, data saved in the storage of mobile data terminal 1 can be loaded onto a data base in service center 28 either by data telecommunication or via a direct connection with computer system 29. By calling up fourth line 34*d* of the main menu, the date and/or the time can be changed. The fifth line can be used to bring the user back to the version display.

Figure 4A:
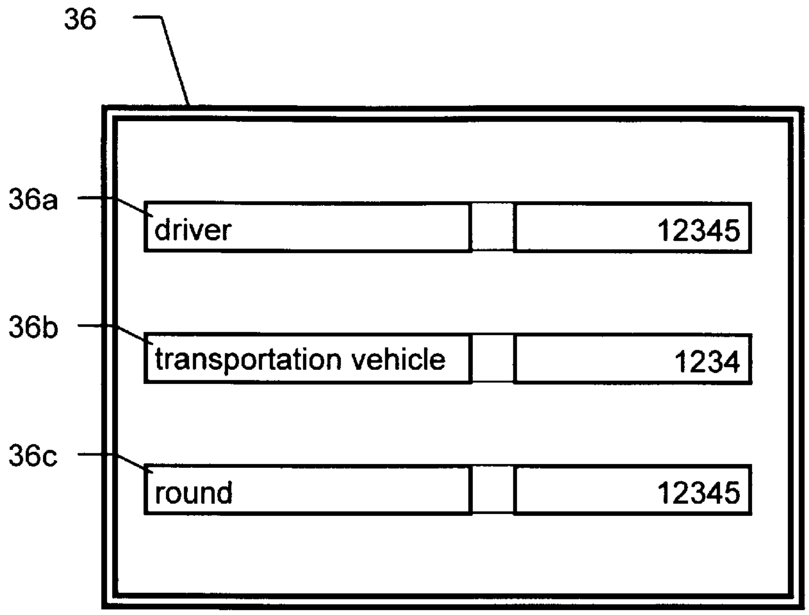
FIGS. 4*a*–4*b* depict the display of the mobile data terminal showing the driver's data and confirmation of the driver's data.

Before any round can be commenced, the data have to be entered which relate to driver 24. When the first line 34*a* of the main menu 34 is selected, the message "data already transmitted" appears on display 4 of mobile data terminal 1. If this message is confirmed by means of key 2*d* "END" or "INPUT" key 2*h*, then the main menu reappears. By pressing upper right key 2*b*, the user will be returned to display 36 shown in FIG. 4*a*.

When this display 36 appears in the display of mobile data terminal 1, barcodes 24*a* for driver 24, for transportation vehicle 26 and for the round to be made can be entered into the mobile data terminal. The data obtained by means of the barcodes are presented in readable form in display 4. Display 36 for the data consists of three lines 36*a*, 36*b* and 36*c*.

Figure 4B:
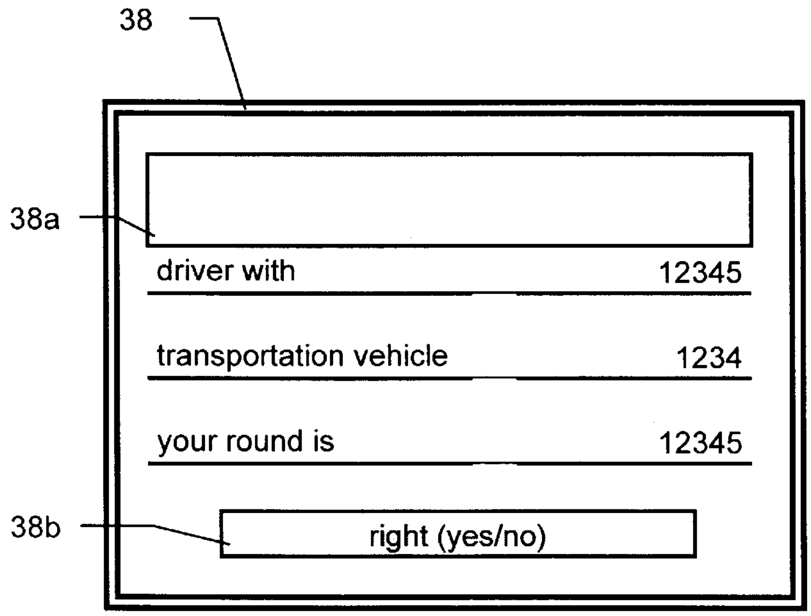

The first line 36*a* represents the number of driver 24, for instance, a five digit number. The second line 36*b* represents the number of vehicle 26 as a four digit number and the third line 36*c* represents the number of the round as a five-digit number. By pressing "INPUT" key 2*h*, driver 24 arrives at display 38 as shown in FIG. 4*b*. With this display the data just entered can be checked. A welcoming message 38*a* appears in display 4 and this is followed by the appearance of the data entered for driver 24, transportation vehicle 26 and the round. Inquiry line 38*b* then appears in which the correctness of the data has to be confirmed. After confirmation of the correctness of data by means of "INPUT" key 2*h*, the user is returned to the first display 34. In the next step, the second line 34*b* of first display 34 can be selected.

Figure 5:
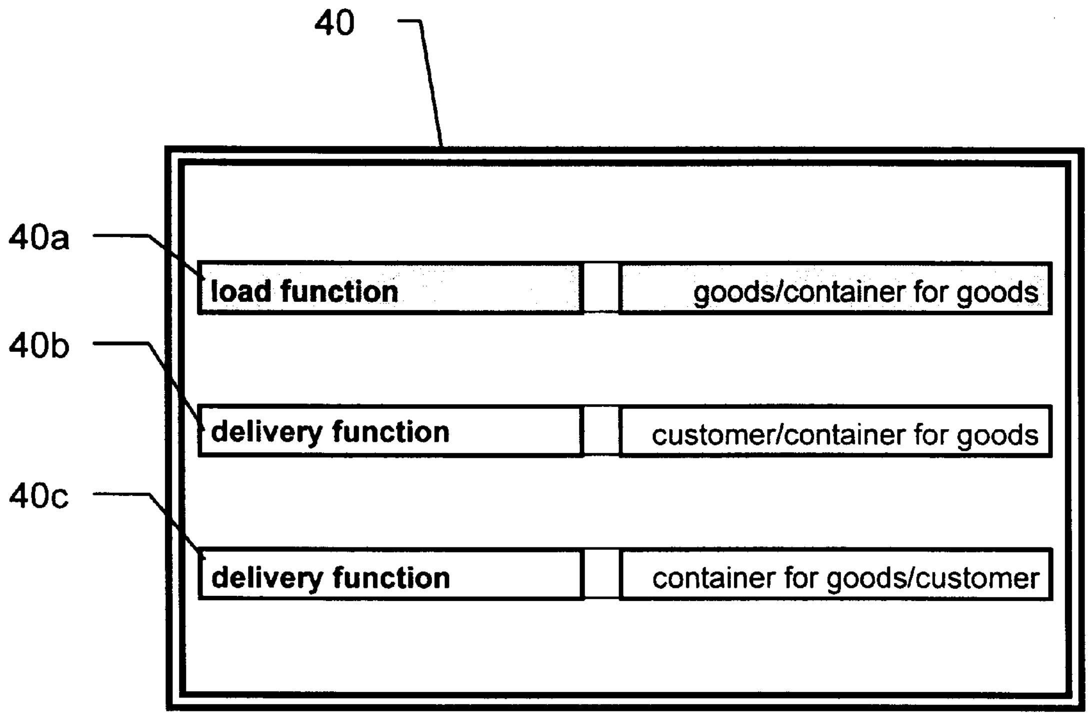
FIG. 5 represents the display of the mobile data terminal showing the menu functions available for a delivery/pickup round.

Driver 24 gets to display 40 as shown in FIG. 5 in which all menu items available for his round appear in display 4 of mobile data terminal 1. The load function for goods/containers for goods $\mathbf{22}_{1a}$, $\mathbf{22}_{1b}$, $\mathbf{22}_{2a}$, . . . $\mathbf{22}_{Na}$, $\mathbf{22}_{Nb}$, $\mathbf{22}_{Nc}$ can be called up in first line 40*a*. The delivery function "CUSTOMER/CONTAINERS FOR GOODS" can be called up in second line 40*b*. In third line 40*c* the menu item "CONTAINERS FOR GOODS/CUSTOMER" can be selected where goods/containers for goods $\mathbf{22}_{1a}$, $\mathbf{22}_{1b}$, $\mathbf{22}_{2a}$, . . . $\mathbf{22}_{Na}$, $\mathbf{22}_{Nb}$, $\mathbf{22}_{Nc}$ to be delivered are first entered and afterwards the barcode of the customer on the round to be made by the driver.

Figure 6A:
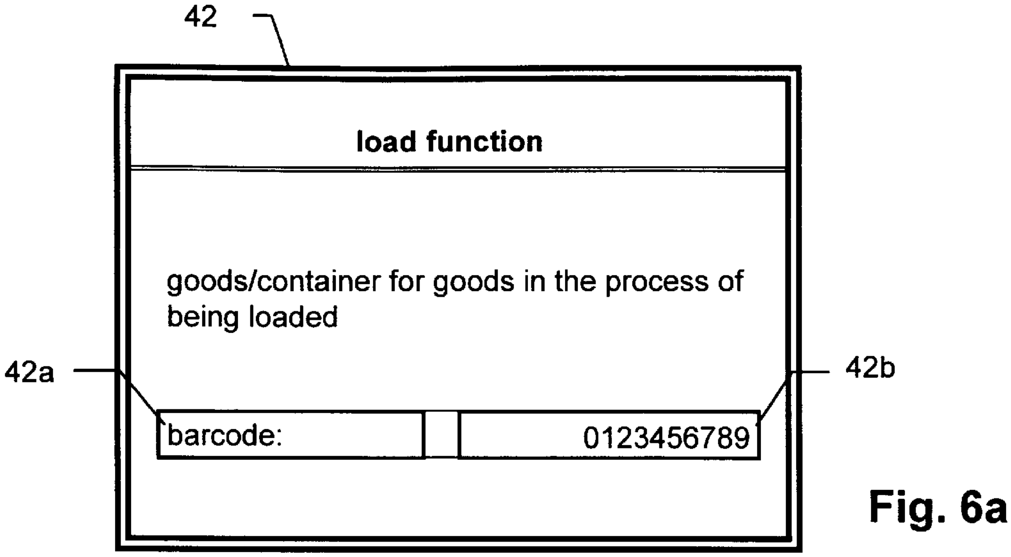
FIGS. 6*a*–6*c* show the display of the mobile data terminal giving the data of the loaded container, the customer's data together with the data of the delivered container.
Figure 6B:
Figure 6C:
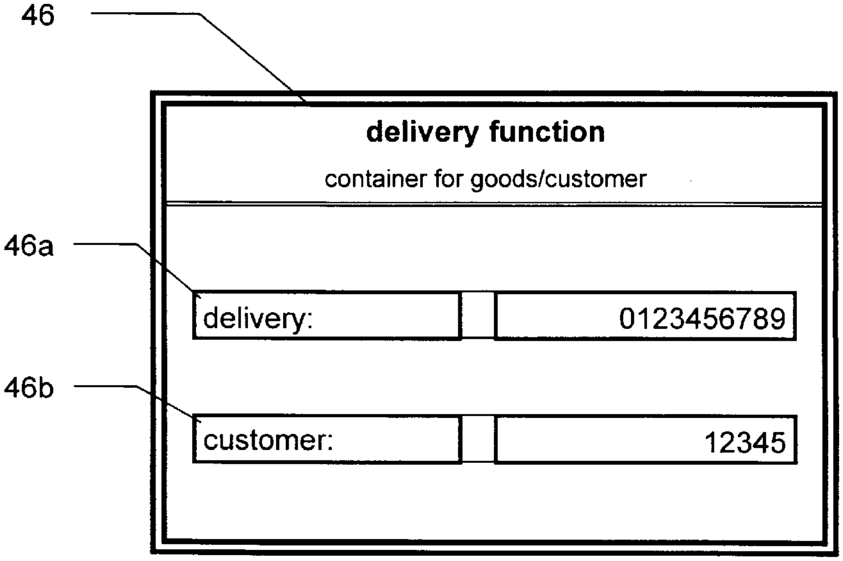
Figure 7:
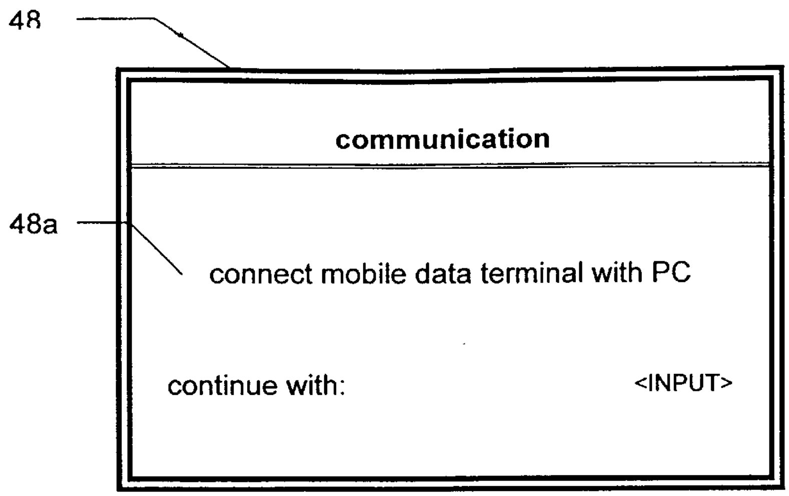
FIG. 7 depicts the display of the mobile data terminal with the data transfer information.

Selection of one of the menu points, as shown in FIG. 5, will allow the user to get to displays 42, 44 and 46 of display 4 (as shown in FIGS. 6*a* to 6*c*) of mobile data terminal 1. Display 42 provides driver 24 with a readable representation of the barcodes of the goods/containers for goods $\mathbf{22}_{1a}$, $\mathbf{22}_{1b}$, $\mathbf{22}_{2a}$, . . . $\mathbf{22}_{Na}$, $\mathbf{22}_{Nb}$, $\mathbf{22}_{Nc}$ which have been loaded onto transportation vehicle 26. Line 42*a* displays a ten digit number 42*b* which corresponds to the entered barcode $\mathbf{32}_{1b}$, $\mathbf{32}_{2a}$, . . . $\mathbf{32}_{Na}$, $\mathbf{32}_{Nb}$, $\mathbf{32}_{Nc}$. The positions 1 to 5 correspond to the number of loaded goods/containers for goods $\mathbf{22}_{1a}$, $\mathbf{22}_{1b}$, $\mathbf{22}_{2a}$, . . . $\mathbf{22}_{Na}$, $\mathbf{22}_{Nb}$, $\mathbf{22}_{Nc}$ and the positions six to ten must agree with the number entered into display 36 for the number of the round. The mobile data terminal 1 checks this and, in case of a discrepancy will display, for example, the message "Wrong Round". By pressing "ACQUISITION" key 2*c*, line 42*a* for the number 42*b* is emptied and a new barcode $\mathbf{32}_{1a}$, $\mathbf{32}_{1b}$, $\mathbf{32}_{2a}$, . . . $\mathbf{32}_{Na}$, $\mathbf{32}_{Nb}$, $\mathbf{32}_{Nc}$ for goods/containers for goods $\mathbf{22}_{1a}$, $\mathbf{22}_{1b}$, $\mathbf{22}_{2a}$, . . . $\mathbf{22}_{Na}$, $\mathbf{22}_{Nb}$, $\mathbf{22}_{Nc}$ can be entered. When driver 24 has recorded all data for goods/containers for goods $\mathbf{22}_{1a}$, $\mathbf{22}_{1b}$, $\mathbf{22}_{2a}$, . . . $\mathbf{22}_{Na}$, $\mathbf{22}_{Nb}$, $\mathbf{22}_{Nc}$ he can return to display 40 (shown in FIG. 5) by pressing "END" key.

Selection of second line 40*b* (FIG. 5) will call up delivery function "CUSTOMER/CONTAINERS FOR GOODS". The program then checks with mobile data terminal 1 to determine whether the load function was performed in the prior step. If this was not the case, a reminder appears in display 4 that this function has to be first performed. Display 44 (FIG. 6*b* ) has line 44*a* into which barcodes $\mathbf{30}_1$, $\mathbf{30}_2$ to $\mathbf{30}_N$ of customers $\mathbf{20}_1$, $\mathbf{20}_2$ to $\mathbf{20}_N$ can be entered and second line 44*b* into which the barcodes of goods/containers for goods $\mathbf{22}_{1a}$, $\mathbf{22}_{1b}$, $\mathbf{22}_{2a}$, . . . $\mathbf{22}_{Na}$, $\mathbf{22}_{Nb}$, $\mathbf{22}_{Nc}$ to be delivered can be entered. The number of the customer shown in first line 44*a* is compared by mobile data terminal 1 with the number of the customer obtained during the load function. In this way, it is possible to check whether or not customers $\mathbf{20}_1$, $\mathbf{20}_2$ to $\mathbf{20}_N$ are on the round. In the case of a discrepancy, a message will appear in mobile data terminal 1 which will say, for example, "wrong customer". The barcodes of goods/containers for goods $\mathbf{22}_{1a}$, $\mathbf{22}_{1b}$, $\mathbf{22}_{2a}$, . . . $\mathbf{22}_{Na}$, $\mathbf{22}_{Nb}$, $\mathbf{22}_{Nc}$ delivered to the customer are scanned and the number appears in second line 44*b* of display 44. Mobile data terminal 1 also checks if goods/containers for goods $\mathbf{22}_{1a}$, $\mathbf{22}_{1b}$, $\mathbf{22}_{2a}$, . . . $\mathbf{22}_{Na}$, $\mathbf{22}_{Nb}$, $\mathbf{22}_{Nc}$ belong to customers $\mathbf{20}_1$, $\mathbf{20}_2$ to $\mathbf{20}_N$. The scanned number is compared with number 42*b* which was already read during the load function. By pressing "DATA ACQUISITION" key 2*c*, the area of line 44*b*, in which the number appears, is again emptied, thus enabling the input of data for a new delivery round. After finishing the delivery to a customer, “END” key 2*d* is pressed. The program of mobile data terminal 1 checks if the delivery has been completed. If this is the case, display 4 of mobile data terminal 1 shows display 40.

Selection of third line 40*c* (FIG. 5) calls up the delivery function “CONTAINERS FOR GOODS/CUSTOMER”. FIG. 6*c* shows display 46 with line 46*a* for entering barcodes $\mathbf{32}_{1b}$, $\mathbf{32}_{2a}$, . . . $\mathbf{32}_{Na}$, $\mathbf{32}_{Nb}$, $\mathbf{32}_{Nc}$ for goods/containers for goods $\mathbf{22}_{1a}$, $\mathbf{22}_{1b}$, $\mathbf{22}_{2a}$, . . . $\mathbf{22}_{Na}$, $\mathbf{22}_{Nb}$, $\mathbf{22}_{Nc}$ The number shown in first line 46*a* for goods/containers for goods $\mathbf{22}_{1a}$, $\mathbf{22}_{1b}$, $\mathbf{22}_{2a}$, . . . $\mathbf{22}_{Na}$, $\mathbf{22}_{Nb}$, $\mathbf{22}_{Nc}$ is compared with the number shown in second line 46*b* of customer $\mathbf{20}_1$, $\mathbf{20}_2$ to $\mathbf{20}_N$. The number for goods/containers for goods $\mathbf{22}_{1a}$, $\mathbf{22}_{1b}$, $\mathbf{22}_{2a}$, . . . $\mathbf{22}_{Na}$, $\mathbf{22}_{Nb}$, $\mathbf{22}_{Nc}$ consists of a first and a second part. The first part with the positions 1 to 5 relates to the number of the customer and the second part with the positions six to ten relates to the number for goods/containers for goods $\mathbf{22}_{1a}$, $\mathbf{22}_{1b}$, $\mathbf{22}_{2a}$, . . . $\mathbf{22}_{Na}$, $\mathbf{22}_{Nb}$, $\mathbf{22}_{Nc}$. The number for customer $\mathbf{20}_1$, $\mathbf{20}_2$ to $\mathbf{20}_N$ has to agree with the number for customer $\mathbf{20}_1$, $\mathbf{20}_2$ to $\mathbf{20}_N$ on goods/containers for goods $\mathbf{22}_{1a}$, $\mathbf{22}_{1b}$, $\mathbf{22}_{2a}$, . . . $\mathbf{22}_{Na}$, $\mathbf{22}_{Nb}$, $\mathbf{22}_{Nc}$. In this way it is possible to check if customer $\mathbf{20}_1$, $\mathbf{20}_2$ to $\mathbf{20}_N$ on the round has put out the correct goods/containers for goods $\mathbf{22}_{1a}$, $\mathbf{22}_{1b}$, $\mathbf{22}_{2a}$, . . . $\mathbf{22}_{Na}$, $\mathbf{22}_{Nb}$, $\mathbf{22}_{Nc}$ for pickup. In the event of a discrepancy, mobile data terminal 1, displays, for example, the message “wrong pickup”. By pressing “DATA ACQUISITION” key 2*c*, the area of line 46*a* showing the number is again emptied and the acquisition of data for more goods/containers for goods is possible. After completion of a pickup round to a customer, “JUMP” key 2*c* is pressed whereupon a switch is made to second line 46*b* of display 46, and pickup can be performed at another customer. Once the pickup has been completed, “END” key 2*d* is pressed. The program of mobile data terminal 1 checks if the pickup has been completed. If this is the case, display 4 of mobile data terminal 1 shows display 40.

The transfer of data from mobile data terminal 1 to computer system 29 is performed by selecting third line 34*c* in main menu 34. Mobile data terminal 1 also checks if the data are available for transmission. If the data are available for transmisssion, then display 4 of the mobile data terminal 1 shows display 48 bearing command 48*a* “connect the mobile data terminal with the computer!”. The transmission is started by pressing “INPUT” key 2*h*. After completion of transmission, a message appears that the transmission was successfully performed. By pressing “INPUT” key 2*h*, display 4 returns to display 34 of the main menu.

Figure 8A:
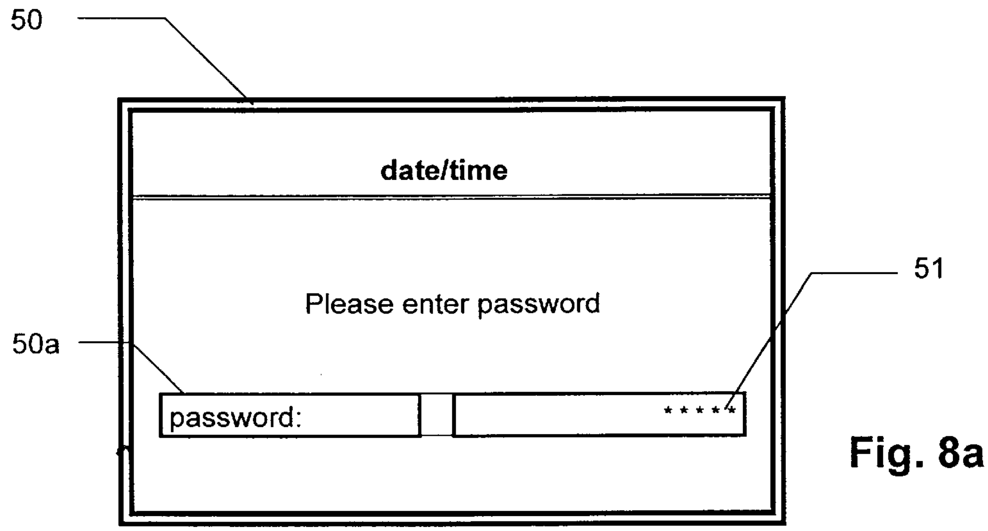
FIGS. 8*a*–8*b* show the entrance menu on the display of the mobile data terminal for changing the system data and the display for changing the systems data.
Figure 8B:
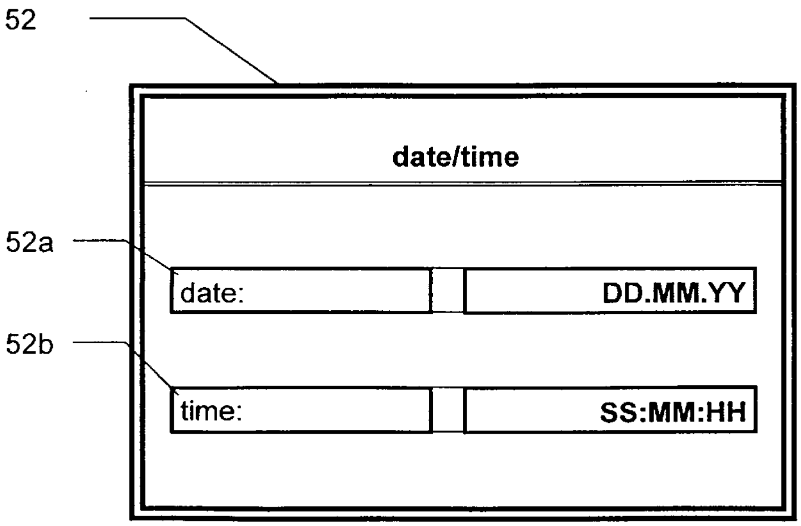

When the fourth line 34*d* of the main menu 34 is selected (see FIG. 8*a*), the display 50 appears in display 4 and the user can change the date/time. A password has to be entered in line 50*a* of display 50 in order to prevent unauthorized tampering. When the correct password is entered, display 52 (see FIG. 8*b*) appears in display 4 of mobile data terminal 1 with a first line 52*a* for the date and a second line 52*b* for the time. By pressing “END” key 2*d* or “INPUT” key 2*h* the user will be returned to main menu 34.

The present invention has been described with reference to a preferred embodiment; however, it is obvious that an person skilled in the art may make modifications in accordance with his capabilities without exceeding the scope of protection of the following claims.

PARTS LIST

1 mobile data terminal
2 keys for manual input
2*a* upper left key
2*b* upper right key
2*c* “DATA ACQUISITION” key
2*b* “END” key
2*e* first arrow key
2*f* second arrow key
2*g* “RUBOUT” key
2*h* “INPUT” key
2*k* “JUMP” key
2*i* “SCAN” key
4 display
6 interface
8 connection for recharging battery
10 barcode scanner
12 side wall
$\mathbf{20}_1$, $\mathbf{20}_2$ . . . $\mathbf{20}_N$ customers
$\mathbf{22}_{1a}$, $\mathbf{22}_{1b}$, $\mathbf{22}_{2a}$, . . . $\mathbf{22}_{Na}$, $\mathbf{22}_{Nb}$, $\mathbf{22}_{Nc}$, goods/containers for goods
24 driver
24*a* barcode of the driver
26 transportation vehicle
26*a* barcode of the transportation vehicle
27 acoustic coupler/mobile telephone
28 service center
29 computer system
$\mathbf{30}_1$, $\mathbf{30}_2$ . . . $\mathbf{30}_N$ barcode of the customer
$\mathbf{30}_{1a}$, $\mathbf{32}_{1b}$, $\mathbf{32}_{2a}$, . . . $\mathbf{32}_{Na}$, $\mathbf{32}_{Nb}$, $\mathbf{32}_{Nc}$ . . . barcode of goods/containers
for goods
34 first display
34*a* first line of first display
34*b*second line of first display
34*c* third line of first display
34*d* fourth line of first display
34*e* fifth line of first display
36 display of driver’s data
36*a* first line of the display of the driver’s data
36*b* second line of the display of the driver’s data
36*c* third line of the display of the driver’s data
38 display for performing checks
38*a* welcome formula
38*b* inquiry line
40 display of the menu points available for a delivery/pickup round
40*a* first line of display 40
40*b* second line of display 40
40*c* third line of display 40
42 display of load function
42*a* ten-digit number in display 42
42*b* number
44 display of delivery function (“CUSTOMER/CONTAINERS FOR
GOODS”)
44*a* first line of display 44
44*b*second line of display 44
46 display of the delivery function (“CONTAINERS FOR GOODS/CUSTOMER”)
46*a* first line of display 46
46*b* second line of display 46
48 communication display
48*a* report
50 display of password
50*a* line of display 50
51 password
52 display for changing date/time
52*a* first line of display 52
52*b* second line of display 52

What is claimed is:

1. A method for tracking and controlling delivery and/or pickup of goods/containers for goods, the method comprising the steps of:

a) taking a mobile data terminal in a service center, said mobile data terminal having an integrated barcode scanner for reading data required for performing tracking and controlling;

b) reading barcoded data of a driver performing the pickup or delivery, of his route and of a vehicle used for transportation;

c) storing the data read in step b) in a storage of mobile data terminal and displaying the data read in step b) in readable form;

d) arriving at all customers on a round and reading of each customer's barcoded data and the data of the goods/containers for goods being picked up or delivered at said customer together with simultaneous storage of date and time;

e) storing the data read in step d) and of the date and time in the storage of the mobile data terminal and displaying the data read in step d) in readable form in a display of the mobile data terminal;

f) indicating the discrepancy between the data stored in the mobile data terminal and the data scanned; and g) transferring the data at the end of the delivery and/or pickup round from the storage of the mobile data terminal to a computer system in the service center.

2. A method according to claim 1, wherein during the pickup of goods/containers for goods from customers the method comprises the steps of:

reading the barcode of the customer, said barcode being located in a pickup room, and displaying the number of the customer in the display;

removing of the goods/containers for goods from the pickup room and reading the barcodes of the goods/containers for goods and displaying the number of the goods/containers for goods in the display of the mobile data terminal; and using a program in the mobile data terminal to determine the customer's number contained in the number on the goods/containers for goods and comparing this number with the customer's number entered into said terminal in a prior step.

3. A method according to claim 1, wherein during the delivery of goods/containers for goods to customers the method comprises the steps of:

reading the barcode of the customer, said barcode being located in the pickup room, and displaying the number of the customer in the display of the mobile data terminal;

depositing the goods/containers for goods in the pickup room and reading the barcodes of the goods/containers for goods and displaying the numbers of the goods/containers for goods in the display of the mobile data terminal; and using a program in the mobile data terminal to determine the customer's number contained in the number on the goods/containers for goods and comparing this number with the customer's number read into the mobile data terminal in a prior step.

4. A method according to claim 3, comprising the further steps of:

reading in the service center of all barcodes of goods/containers for goods to be delivered during a round; and using the program in the mobile data terminal to determine the route number contained in the number on the goods/containers for goods and comparing of this number with the tour's number read into the mobile data terminal in a prior step.

5. A method according to claim 1, wherein the transfer of the stored data from the mobile data terminal to the computer system in the service center is performed by means of a data tele-transfer unit.

6. A method according to claim 1, wherein the transfer of the stored data from mobile data terminal to computer system in service center is performed by means of a conventional cable connection and a suitable communication program.

7. An arrangement for tracking and controlling delivery and/or pickup of goods/containers for goods, the arrangement comprising:

a mobile data terminal with a display and keys for data input and for activating certain functions stored in the mobile data terminal;

a service center with a computer system to which the data stored in the mobile data terminal can be transferred or in which the functions stored into mobile data terminal can be updated;

a barcode scanner is integrated into the mobile data terminal;

a barcode allocated to each customer, a barcode allocated to each of the containers for goods, a barcode allocated to a driver, a barcode allocated to a transportation vehicle, and a barcode allocated to each round; and the barcode for each container for goods contains information with respect to the round and the allocated customer and a discrepancy between the data stored in the mobile data terminal and the data scanned is detected.

8. An arrangement according to claim 7, wherein the data stored in the mobile data terminal can be transmitted to the computer system in the service center via data telecommunication.

9. An arrangement according to claim 7, wherein the data stored in the mobile data terminal can be transmitted via a conventional cable connection and an appropriate communication program.

* * * * *